United States Patent Office 3,005,942
Patented Oct. 24, 1961

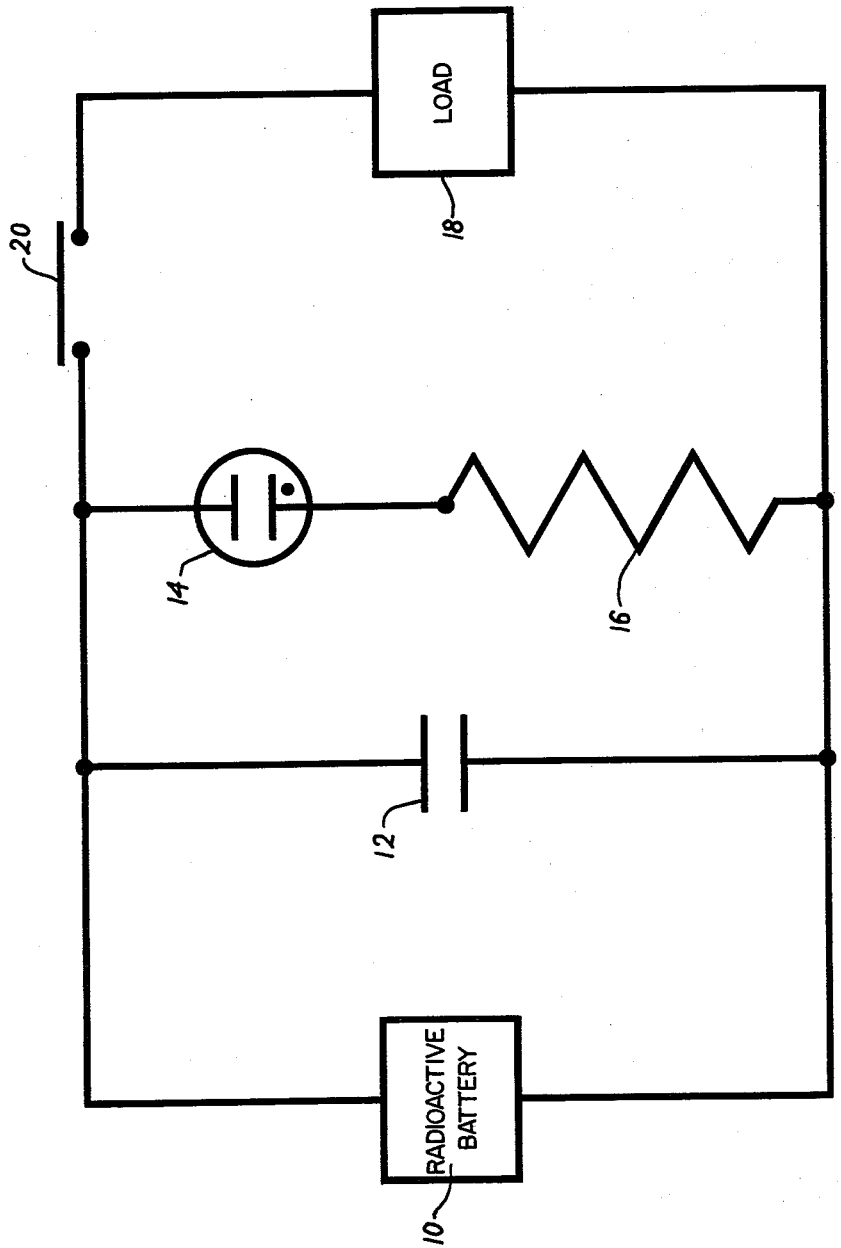

3,005,942
REGULATED POWER SUPPLY
Rene J. Perdreaux, Jr., Brooklyn, and Stanley Wallack, Jackson Heights, N.Y., assignors to Leesona Corporation, a corporation of Massachusetts
Filed Mar. 16, 1955, Ser. No. 495,253
2 Claims. (Cl. 320—1)

The present invention comprises a regulated power supply circuit and more particularly pertains to such a circuit incorporating a radioactive battery.

Radioactive batteries are known in the art and a specific type of radioactive battery is described in detail in the application Serial No. 470,566 of Harry C. Lieb, for "Means for Collecting and Utilizing Electrical Energy of Nuclear Reactions and Method by Which it is Manufactured," filed November 23, 1954. Other radioactive batteries are disclosed in United States Patents 2,517,120; 2,552,050 and 2,555,143, all issued to E. G. Linder on August 1, 1950, May 8, 1951 and May 29, 1951 respectively. Radioactive batteries utilize directly the electrical energy of charged particles, for example, negatively charged beta particles, that are emitted by a supply of radioactive material. This is accomplished by placing a collector electrode or electrodes adjacent the supply of radioactive material to collect the charged particles and to thereby build up an electrical potential between said radioactive material and collector electrode. Such devices are capable of developing very high voltages, for example from 7,000 to 10,000 volts. However, the current supplied by such a battery is extremely low.

The present invention provides a circuit incorporating a radioactive battery that permits said battery to charge a capacitor to provide a reservoir of usable electrical energy. The circuit also includes a non-linear resistance that acts as a shunt across the capacitor to prevent a voltage from developing thereacross that is in excess of a predetermined value.

It is accordingly one object of the present invention to provide a regulated power supply circuit wherein a radioactive battery charges a capacitor to a predetermined voltage below the equilibrium voltage of said battery.

Another object of the present invention is to provide a regulated power supply circuit for use with a radioactive battery wherein a non-linear resistance maintains the voltage across said battery at a value less than the normal equilibrium voltage thereof.

Another object of the present invention is to provide a regulated power supply circuit wherein a radioactive battery charges a capacitor and a non-linear resistance limits the voltage across said capacitor to a predetermined value.

Another object of the present invention is to provide a regulated power supply circuit wherein the voltage across a radioactive battery is maintained at a value less than the normal equilibrium voltage thereof by means of a gas filled cold cathode diode.

Another object of the present invention is to provide a regulated power supply circuit wherein a radioactive battery charges a capacitor and a gas filled cold cathode diode limits the voltage across said capacitor to a predetermined value.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a schematic wiring diagram of the present invention.

Referring now to the drawing, the present invention comprises a radioactive battery 10, which can be one or more of the batteries disclosed in the above-mentioned United States Patents 2,517,120; 2,552,050; 2,555,143 or the above-mentioned application of Harry C. Lieb, and capacitor 12 connected across the terminals of battery 10. A gas filled cold cathode diode 14 is connected in series with a resistor 16 of very high value and said diode and resistor are connected in parallel with capacitor 12. A load 18 is connected in series with a single pole single throw switch 20 and said switch and load are connected in parallel with said capacitor and the diode and resistor.

The circuit of the present invention functions in the following manner. Radioactive battery 10 supplies energy at a very low current level to charge capacitor 12. As the potential across battery 10 and capacitor 12 builds up and approaches the firing voltage of diode 14 the resistance of said diode decreases to permit a trickle of current to pass therethrough and through resistor 16. As a result of the minute flow of current the voltage across battery 10, capacitor 12 and diode 14 and resistor 16 reach equilibrium at a voltage slightly below the firing voltage of said diode inasmuch as additional electrons collected by the battery will merely flow through said diode and resistor to prevent any further build up of potential. When switch 20 is closed, the charge stored in capacitor 12 is discharged through load 18 to perform work.

The circuit of the present invention is capable of many applications, one of which is in the ordnance field wherein load 18 would be an electrically fired detonator employed to initiate the explosive charge carried by a projectile or mine. Another load could be a relay in the position of load 18, the relay being actuated by the discharge of capacitor 12. Yet another use would employ the current from capacitor 12 to trigger the grid of an electronic tube.

Condenser 12 is selected to have a capacity to store the desired quantity of electrical energy. Obviously the greater the capacity of said condenser the longer will be the time needed for it to be fully charged by battery 10. It has been found that the capacitor should be a high resistance type and is preferably selected to have a capacity between 1,000 to 10,000 m.m.f., however, it may be desirable in some instances to employ one having an even higher capacity. It will be obvious to one skilled in the art that the firing voltage of diode 14 determines the voltage that can be impressed across capacitor 12. The value of resistor 16 is very high to prevent diode 14 from firing when its rated voltage is approached, and thus discharging capacitor 12 and preferably is greater than $10^7$ ohms.

It will be obvious to those skilled in the art that other non-linear resistances can be employed in the above described circuit in place of diode 14 and resistor 16 for example, a spark gap or the like.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:
1. In a regulated power supply circuit, a constant current radioactive battery, a capacitor connected across said battery, means for connecting a load across said capacitor, and a non-linear resistor connected across said battery to pass current generated by said battery after a predetermined voltage has been developed to maintain the voltage impressed across said capacitor at a predetermined value below the equilibrium voltage of said battery.

2. In a regulated power supply circuit, a constant current radioactive battery, a capacitor connected across said battery to be charged thereby, means for connecting a load across said capacitor to permit the charge carried by said capacitor to discharge through said load, and a non-linear resistor comprising a cold cathode diode and a resistor in series connected across said battery to pass current generated by said battery after a predetemined voltage has been developed to maintain the voltage impressed across said capacitor at a predetermined value below the equilibrium voltage of said battery.

References Cited in the file of this patent

UNITED STATES PATENTS

| | | |
|---|---|---|
| 1,325,889 | Curtis | Dec. 23, 1919 |
| 2,477,946 | Smith | Aug. 2, 1949 |
| 2,483,755 | Corrington | Oct. 4, 1949 |
| 2,515,632 | Coffin | July 18, 1950 |
| 2,523,297 | Hastings | Sept. 26, 1950 |
| 2,567,373 | Giacoletto et al. | Sept. 11, 1951 |
| 2,693,571 | Higgins | Nov. 2, 1954 |
| 2,700,746 | Vang | Jan. 25, 1955 |
| 2,770,765 | Negus | Nov. 13, 1956 |